United States Patent [19]

Benjamin

[11] 3,801,115
[45] Apr. 2, 1974

[54] QUICK CHANGE TOOL HOLDER

[75] Inventor: Milton L. Benjamin, Chagrin Falls, Ohio

[73] Assignee: Erickson Tool Company, Solon, Ohio

[22] Filed: Feb. 9, 1973

[21] Appl. No.: 331,277

[52] U.S. Cl. ................................ 279/81, 279/1 B
[51] Int. Cl. .......................................... B23b 31/04
[58] Field of Search ............. 279/28, 29, 30, 81, 87, 279/1 B

[56] References Cited
UNITED STATES PATENTS
3,734,517  5/1973  Benjamin .......................... 279/81

Primary Examiner—Francis S. Husar
Attorney, Agent, or Firm—Donnelly, Maky, Renner & Otto

[57] ABSTRACT

A quick change tool holder characterized in that a socket member secured to a machine tool spindle or formed as a part thereof has a bore in which the shank of a tool holder is nonrotatably telescoped and in that the socket member has lock means automatically operative to lock the tool holder in the socket member when the tool holder is inserted to predetermiend position in the socket member as determined by an adjustable lock nut on the tool holder shank; said lock nut being additionally locked to and centered with respect to the socket member.

13 Claims, 6 Drawing Figures

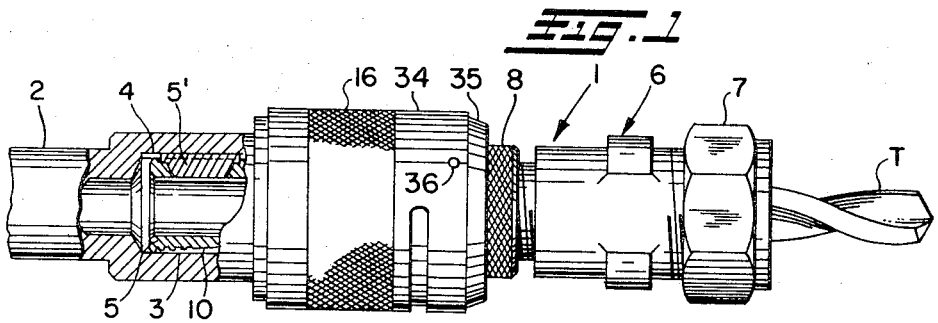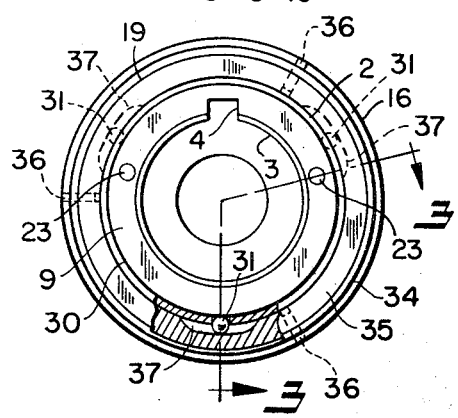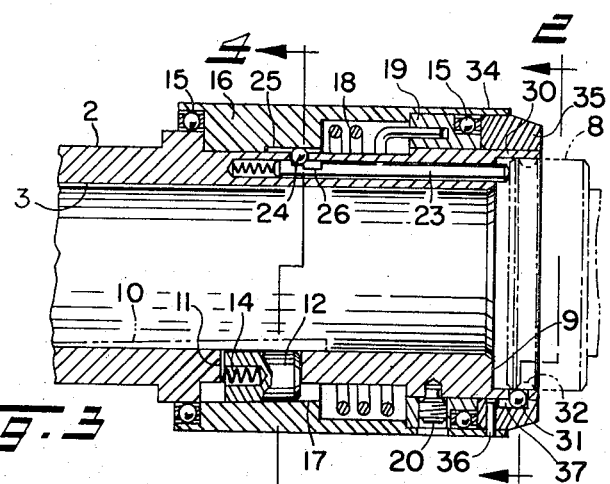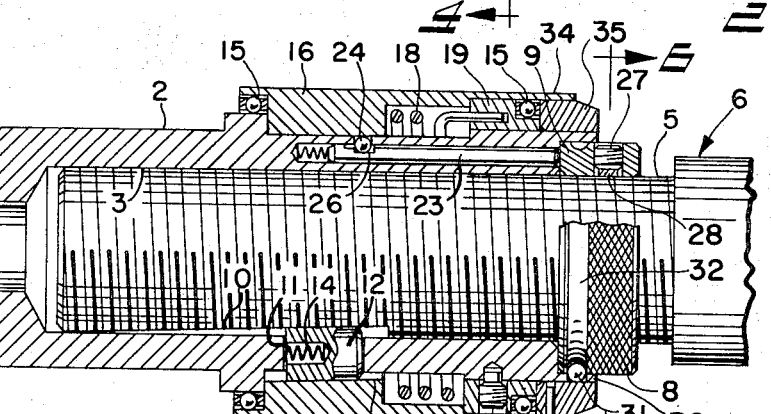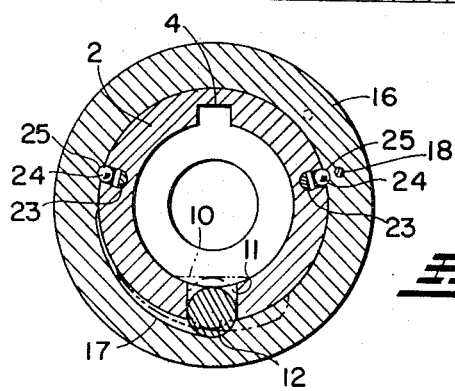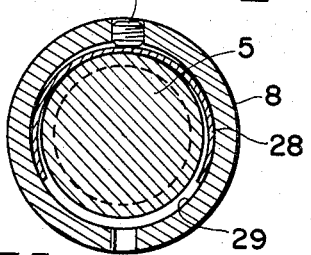

QUICK CHANGE TOOL HOLDER

CROSS REFERENCE TO RELATED APPLICATION

The present application relates to improvements in a tool holder of the type disclosed in the copending application of Milton L. Benjamin, Ser. No. 118,603, filed Feb. 25, 1971 and now U.S. Pat. No. 3,734,517.

BACKGROUND OF THE INVENTION

It is known to provide a tool holder having a threaded shank on which is threaded an adjusting nut by which the cutting end of a tool held by the tool holder may be accurately positioned with respect to a locating face on the socket member which is engaged by the nut when the shank is axially inserted and keyed in a close fitting bore in the socket member. In automotive type tool holders the threaded shank has adjacent its end a so-called "whistle flat" which is inclined with respect to the axis of the shank and socket member bore and which is adapted to be engaged by a set screw in the socket member thus to lock the tool holder from axial withdrawal from the socket member. Axial inward movement of the tool holder with respect to the socket member is prevented by engagement of an adjusting nut on the shank with a locating face at the end of the socket member.

As evident, when it is desired to change tool holders it is a time-consuming operation to loosen the aforesaid set screw in order to remove one tool holder for replacement by another followed by retightening of the set screw. Furthermore, the loosening and tightening of the set screw requires the provision of a screw driver or wrench. Moreover, such set screw may become loosened by vibration or shock loads.

SUMMARY OF THE INVENTION

The quick change tool holder constituting the present invention contemplates the provision of a socket member having a spring-biased lock actuator which is latched in tool holder receiving or withdrawing condition so that when the tool holder shank is inserted into the bore of the socket member, the latch is automatically released so that the spring-biased lock actuator snaps to a position whereat it urges a locking member into firm locking engagement with a inclined flat on the shank, and urges three or more equally spaced apart locking and centering balls into engagement with a groove in an adjustable lock nut on the shank. Thus, the tool holder is accurately held coaxially in the socket member and is firmly held against withdrawal except by moving the lock actuator back to its latched position.

The present invention also contemplates a quick change tool holder in which the locking member comprises a cylindrical roller which is cammed radially into locking engagement with an inclined flat on the tool holder shank by means of a circumferentially extending cam surface of a rotary lock actuator, the cam surface being of self-locking angle such that axial withdrawal force on the tool holder will not cause backward rotation of the lock actuator to permit radial outward movement of the locking member, withdrawal of the tool holder being also resisted by locking balls engaged in a groove of an adjusting nut on the shank.

The quick change tool holder herein also has axially movable latch operating pins which are engaged by the tool holder to release the lock acutator so that the latter may, under the influence of spring bias thereon, promptly move to effect actuation of a lock member into locking engagement with the tool holder shank and lock balls into locking and centering engagement with an adjusting nut on the tool holder shank.

Other objects and advantages of the present invention will appear hereinafter.

BRIEF DESCRIPTION OF THE DRAWING

FIG. 1 is a side elevation view, partly in cross-section, of a quick change tool holder assembly embodying the present invention;

FIG. 2 is an end elevation view, partly in cross-section, of the socket member of the tool holder assembly herein taken substantially along the line 2—2, FIG. 3 with the tool holder removed;

FIG. 3 is a cross-section view taken substantially along the line 3—3, FIG. 2;

FIG. 4 is a cross-section view taken substantially along the line 4—4, FIG. 3 showing the socket member in condition to permit axial withdrawal or axial insertion of the tool holder shank therefrom or thereinto;

FIG. 5 is a cross-section view showing the tool holder and socket member locked together against axial separation; and FIG. 6 is a cross-section view taken substantially along the line 6—6, FIG. 5.

DETAILED DESCRIPTION OF THE INVENTION

As shown in FIG. 1, the quick change tool holder assembly 1 comprises a socket member 2 which may be formed as a part of the machine tool spindle or which may be detachably secured to such spindle, said socket member 2 providing a bore 3 and keyway 4 to nonrotatably receive the shank 5 of a tool holder 6 which may be of any well known construction, including, for example, a collet type chuck 7 for gripping a tool T. The shank 5 is threaded and has adjustable thereon a lock nut 8 which is adapted to engage the locating end face 9 of the socket member 2 so as to predeterminedly position the end of the tool T from such locating face 9.

The socket member 2 as aforesaid has a shank receiving bore 3 formed with a longitudinal keyway 4 in which the key 5' of the shank 5 is received, the major diameter of the threads on the shank 5 being substantially equal (e.g. 0.0007 inch to 0.0015 inch less) to the diameter of the bore 3 so that the shank 5 is a close sliding fit in the bore 3.

The shank 5 has an inclined flat 10 thereon diametrically opposite the keyway 4 which in automotive tooling jargon is called a "whistle flat."

Diametrically opposite the keyway 4 in the socket member 2 is a radial opening 11 through the wall in which is disposed a radially movable locking member 12 which preferably is in the form of a cylinder which is urged by the spring 14 against the axially outer end of the opening 11.

Rotatably supported on the socket member 2 as by bearings 15 is a rotatable lock actuator 16 which has a circumferentially extending cam surface 17 which, when actuator 16 rotates in a counterclockwise direction from the solid line position of FIG. 4 to the dot-dash line position, is effective to urge the locking member 12 radially inwardly into firm engagement with the inclined flat 10 on the shank 5.

When the lock actuator 16 is in the unlocking position shown in FIG. 3, the shank 5 may be withdrawn from the bore 3 and the flat 10 will cam the locking member 12 to the FIG. 3 position so that another tool holder assembly 6 may be inserted. The lock member 12 will be frictionally retained in the FIG. 3 position by reason of the force exerted thereon by spring 14 and, in addition, the shank 5 and lock member 12 may be chamfered as shown to facilitate axial insertion of the shank 5 into bore 3. The lock actuator 16 is, as aforesaid, rotatably supported on the socket member 2 by the bearings 15 and is spring-biased toward locking position by means of the torsion spring 18 which has its ends fixed respectively in the lock actuator 16 and in the ring member 19 which is secured on the socket member 2 by means of the dog point set screw 20.

The lock actuator 16 is held in unlocking position by spring actuated latch pins 23 which are effective to radially outwardly move the balls 24 into grooves 25 in the lock actuator 16. The latch pins 23 project axially beyond the locating face 9 of the socket member 2 and are so arranged that when the tool holder shank 5 is inserted into bore 3 the left-hand end face of the lock nut 8 will engage the axially outer ends of said pins 23 and push said pins 23 toward the left as viewed in FIG. 3. When the lock nut 8 engages the face 9, the latch pins 23 will have been pushed in as shown in FIG. 5, with the grooves 26 thereof opposite the balls 24. The balls 24 are thus cammed in by the grooves 25 by the rotational force on the lock actuator 16 exerted by the torsion spring 18. When the latch pins 23 are pushed in as in FIG. 5, the lock actuator 16 is released for counterclockwise rotation as viewed in FIG. 4 so that the circumferentially extending and inclined cam surface 17 forces the locking member 12 radially inward into firm locking engagement with the whistle flat 10.

As evident, the flat 10 on the shank 5 is of sufficient length to accommodate a wide range of axial adjustment of the lock nut 8 on the shank 5 while yet achieving firm and accurate locking of the shank 5 in the socket member 2. To prevent damage to the Acme or like threads on the shank 5, the set screw 27 bears on a spring ring 28 which is contained in an undercut 29 in the lock nut 8 and which is of axial width exceeding the thread pitch.

The socket member 2 has a tubular extension 30 to receive the end portion of the lock nut 8 as shown in FIGS. 3 and 5, and has three or more equally spaced radial holes in which locking and centering balls 31 are radially movable into and out of engagement with a peripheral groove 32 in said lock nut 8.

The lock actuator 16 also has a tubular extension 34 beyond the ball bearing 15 to which a ball cam ring 35 is secured by pins 36, said cam ring 35 having cam grooves 37 operative to cam the locking and centering balls 31 radially inward into engagement with the lock nut groove 32 when the lock actuator 16 and cam ring 35 are rotated by spring 18 to the locking position shown in FIG. 5. Accordingly, the balls 31 firmly support the tool holder 6 coaxially of the bore 3 of the socket member 2 and firmly retain the lock nut 8 in abutting engagement with the locating face 9. In heavy duty work wherein severe pullout forces may be imposed on the tool holder 6 as when the tool T tends to "hog" into the workpiece, the balls 31 effectively resist movement of the lock nut 8 away from the locating face 9 and tilting or eccentric movement of the tool holder 6 with respect to the socket member 2. Otherwise, without the balls 31, severe pullout forces may cause wedging at the lock member 12 due to the small angle of the whistle flat 10 and consequent slight movement of the lock nut 8 away from the locating face and eccentric movement of the shank 5 taking up the minute clearance between the shank 5 and the bore 3.

The embodiments of the invention in which an exclusive property or privilege is claimed are defined as follows:

1. In combination, a socket member having a bore at one end thereof; a tool holder having tool gripping means at one end and having a shank at the other end nonrotatably and axially slidably telescoped in said bore; a lock nut axially adjustably threaded on said shank for abutting engagement with said one end of said socket member to constitute a positive stop for axial thrust load imposed on said tool holder by a tool in said gripping means and to predeterminedly axially locate said gripping means with reference to said one end of said socket member; lock means comprising a rotary lock actuator on said socket member having a circumferentially extending cam surface, and a lock member radially movable in said socket member by said cam surface into radially overlapping relation to said shank upon rotation of said lock actuator thus to lock said tool holder and socket member against axial separation from a position whereat said lock nut is in abutting engagement with said one end of said socket member; said socket member having a tubular extension radially movably carrying other locking members for movement into and out of engagement with a peripheral groove in said lock nut; and a cam ring secured to said lock actuator for rotation therewith operative to actuate said other locking members into locking engagement with said groove to retain said tool holder coaxially in said bore and to retain said lock nut in abutting engagement with said one end of said socket member.

2. The combination of claim 1 wherein spring means biases said lock actuator and said cam ring in a direction to effect locking together of said tool holder and said socket member; and wherein latch means operated by said lock nut retains said lock actuator and said cam ring in a position permitting axial insertion or withdrawal of said shank until said shank is inserted to effect tripping of said latch means by said lock nut.

3. The combination of claim 1 wherein said shank and lock member have interengaged inclined portions which are radially overlapped when said lock member is radially moved by said cam surface; and wherein said groove and other locking members are engaged at a steeper angle to provide added resistance to movement of said lock nut out of engagement with said one end of said socket member by severe pullout forces on said tool holder.

4. The combination of claim 1 wherein said shank has an inclined flat on its surface with which said lock member is engaged when radially moved by said cam surface; and wherein said other locking members comprise at least three equally spaced balls whose centers lie in a plane parallel to said one end.

5. The combination of claim 1 wherein spring means biases said lock actuator and cam ring in a direction to lock said tool holder and socket member against axial separation, said lock actuator being manually movable against said spring means in the opposite direction to permit axial separation of said tool holder and socket member; and wherein latch means on said socket member actuated by said lock nut retains said lock actuator in the last-mentioned position until actuated by said lock nut upon axial insertion of said shank into said bore as said lock nut is moved into abutting engagement with said one end of said socket member.

6. In combination, a socket member having a bore; a tool holder having a shank nonrotatably received in said bore; a lock member movable in said socket member to engage said shank to retain said tool holder and socket member axially together; spring biased cam means operative to so move said lock member; and latch means operated by said tool holder upon axial insertion of said shank into said bore to release said cam means for actuating said lock member to engage said shank; said shank having shoulder means thereon adapted to engage the axially outer end face of said socket member, said shoulder means being operative upon insertion of said shank into said bore to operate said latch means to release said cam means for movement to engage said locking member with said shank; said latch means comprising an axial pin having an end engageable with said shoulder means, said axial pin having a transverse groove which retains a latch member in engagement with said cam means until said shoulder means moves said axial pin, at which time, said latch member is movable into a deeper portion of said transverse groove thus to release said cam means for movement to engage said locking member with said shank; said shoulder means having a peripheral groove; and other lock members movable in said socket member to engage said groove; said cam means being operative to so move said other lock members when said cam means is released by operation of said latch means.

7. The combination of claim 6 wherein said cam means is rotationally spring biased on said socket member and has circumferentially extending cam surfaces engageable with said lock member and with said other lock members; wherein said lock member comprises a radially movable pin in said socket member moved radially inward to engage said shank when said cam means is released by operation of said latch means; and wherein said other lock members comprise balls in said socket member moved radially inward to engage in said groove when said cam means is released by operation of said latch means.

8. The combination of claim 7 wherein said cam surface engaging said lock member is inclined with respect to the axis of said shank; and wherein said shank has an inclined face engaged by said pin to prevent axial withdrawal of said shank when said cam means has been released by said latch means; and wherein said groove and other lock members are engaged at a steeper angle to provide added resistance to movement of said shoulder means out of engagement with said outer end face by severe pullout forces on said tool holder.

9. The combination of claim 1 wherein spring means biases said lock actuator and cam ring in a direction to effect locking together of said tool holder and said socket member; and wherein latch means including an operating member projecting axially from said one end of said socket member retains said lock actuator and cam ring in a position permitting axial insertion or withdrawal of said shank until said shank is inserted to engage said lock nut with said operating member to trip said latch means as said lock nut moves into abutting engagement with said one end of said socket member.

10. The combination of claim 1 wherein said socket member has shoulder means on which ball bearings are supported in axially spaced apart relation; wherein said lock actuator comprises a tubular member journaled on said bearings and having said cam surface on its interior surface between said bearings engageable with said lock member; and wherein said cam ring is disposed axially outwardly adjacent to one of said ball bearings.

11. The combination of claim 10 wherein a coiled torsion spring means between said tubular member and one of said shoulder means biases said tubular member cam ring in a direction to effect locking together of said tool holder and said socket member; and wherein latch means including an operating member projecting axially from said one end of said socket member retains said tubular member and cam ring in a position permitting axial insertion or withdrawal of said shank until said shank is inserted to engage said lock nut with said operating member to trip said latch means as said lock nut moves into abutting engagement with said one end of said socket member.

12. The combination of claim 1 wherein said socket member has a rectangular opening with axially spaced apart end walls and circumferentially spaced apart side walls; wherein said lock member comprises a cylindrical pin in said opening which is compressed across a diametral plane between said cam surface and an inclined flat on said shank; and wherein said other lock members comprise at least three equally spaced apart balls whose centers lie in a plane parallel to said one end of said socket member.

13. The combination of claim 1 wherein said lock nut has an internal circumferential groove; wherein an arcuate bearing member of axial width exceeding the pitch of the shank and lock nut threads is disposed in said internal groove; and wherein a radial set screw in said lock nut presses said bearing member into frictional engagement with the shank threads to retain said lock nut in any desired axially adjusted position on said shank without damaging said shank threads.

* * * * *